April 30, 1929.

F. F. BURDEN 1,711,108

PNEUMATIC TIRE DEFLATION INDICATOR

Filed Nov. 27, 1928

Inventor
F. F. Burden
by Hazard and Miller
Attorneys

Patented Apr. 30, 1929.

1,711,108

UNITED STATES PATENT OFFICE.

FERN F. BURDEN, OF COMPTON, CALIFORNIA.

PNEUMATIC-TIRE-DEFLATION INDICATOR.

Application filed November 27, 1928. Serial No. 322,168.

This invention relates to signaling devices and more particularly to a device capable of giving a warning signal when the pneumatic tire with which it is associated has become deflated to a predetermined minimum pressure.

An object of the invention is a provision of a signaling device securable upon wheel of a vehicle which is equipped with a pneumatic tire and which is adapted to give a warning signal when the pressure within that tire has decreased to a predetermined minimum.

A more detailed object is a provision of a suitable sound producing device securable inside the rim of a wheel provided with a pneumatic tire, this device having a connection to the tire by means of which the signaling device is held inoperative throughout the period that the pressure within the tire remains above a certain minimum.

A further object of the invention is the provision of an indicating device of the general character described in which the means for holding the device inoperative while the tire is properly inflated comprises a flexible strip disposed between the tube and casing of the tire and is frictionally retained thereby against longitudinal displacement until the pressure within the tube has decreased sufficiently to eliminate the frictional retention of the flexible strip, after which the strip will be permitted to slide longitudinally between the tube and casing and thus permit the signaling device to become operative.

A further object is the provision of a signaling device and means for holding the device inoperative, as described, which are of extremely simple nature, resulting in decreased manufacturing cost and ease of operation and installation and yet, which is capable of operating efficiently to give an unmistakable warning when the tire with which the device is associated, has become dangerously deflated.

The invention possesses other objects and advantageous features, some of which, with those enumerated, will be set forth in the following description of the invention's particular embodiment which is illustrated in the drawings accompanying and forming part of the specification.

Referring to the drawings.

Figure 1:
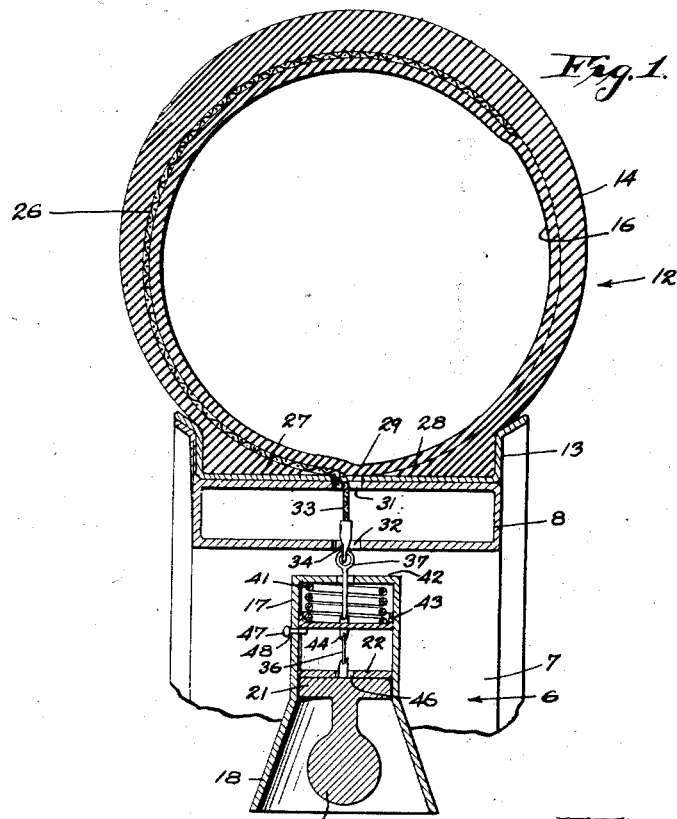
Figure 1 is a sectional view taken transversely through a pneumatic tire and its associated rim and wheel felloe and showing a signaling device embodying the features of my invention with the operative parts thereof in the positions assumed thereby when the tire is sufficiently inflated.
Figure 2:
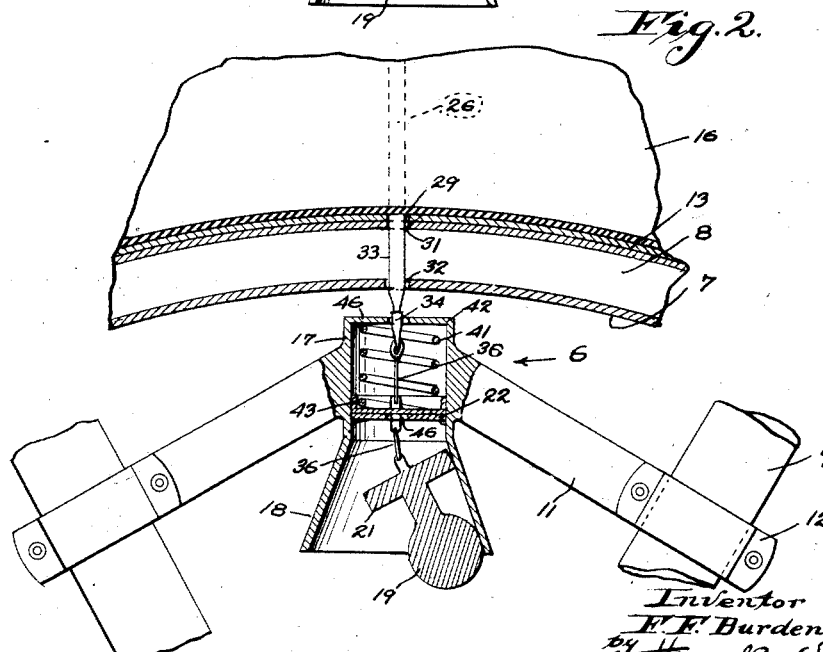
Fig. 2 is a sectional view taken longitudinally through the tire rim and felloe of Fig. 1 and showing the signaling device with the operative parts thereof in the positions assumed thereby after the tire has become deflated.

In terms of broad inclusion, the tire deflation indicator of my invention comprises a signaling device securable to a wheel provided with a pneumatic tire. This signaling device being normally held inoperative by an element which is in engagement with the tire in such a manner that it is adapted to hold the signaling device inoperative throughout the period that the tire is properly inflated.

Specifically describing the most practical embodiment of the invention of which I am at present aware, the signaling device is indicated in its entirety by the reference numeral 6. This signaling device is adapted to be positioned inside the inner face 7 of the felloe 8 of a vehicle wheel and between two of the spokes 9 thereof. For this purpose a bracket 11 is provided upon each of two opposite sides of the signaling device 6, each of these brackets 11 being provided with a clamp 12 at its outer end for rigidly securing the device in position between the two of the spokes 9.

In practicing my invention, I contemplate employing the signaling device in conjunction with tires mounted upon demountable rims as well as those mounted upon non-demountable rims. Suffice it for the purpose of explanation, however, to discuss the invention in connection with a tire 12 mounted upon a demountable rim 13, this rim being adapted to be removably secured upon the felloe 8 in the well known manner. The tire 12 comprises an outer casing 14 and inflatable tube 16.

The signaling device 6, comprising a tubular portion 17 and a flaring portion 18 adapted to function as a bell and create a warning sound when struck as by its clapper 19 and thus set into vibration. The clapper 19 is provided with a flange 21 which normally is in engagement with a partition 22 extending across the tubular portion 17 adjacent the bottom thereof. This partition 22 may be held in place in any convenient manner, such as by soldering.

Means for holding the clapper 19 and its flange 21 in elevated position within the signaling device 6 are provided in the form of a flexible strip 26, disposable between the tube 16 and its casing 14 and frictionally held thereby against longitudinal displacement. When the tube 16 is properly inflated, one end of the strip 26 passes out of the casing 14 between opposite edges 27 and 28 thereof, through an aperture 29 in the rim 13 and through apertures 31 and 32 in the felloe 8. This end 33 of the strip 26 is provided with any suitable fastening means such as a hook 34.

The clapper 19 is provided with a flexible connector 36, the upper end of which carries an eye 37 engageable upon the hook 34 to normally hold the clapper 19 with its flange 21 against the partition 22 so long as the tire 12 remains inflated sufficiently to prevent longitudinal displacement of the flexible strip 26.

In order to insure that the strip 26 will be withdrawn from the tire 12 when the latter has become deflated and thus permit the signaling device to become operative, a spring 41 is disposed within the tubular portion 17 under compression between the top 42 thereof, and a plunger 43 slidable within the tubular portion 17. This plunger 43 is carried by the flexible connector 36 as by being rigidly attached to one of the links 44 thereof. The downward motion of the plunger 43 is limited by its coming in contact with the upper face of the partition 22, it being understood, of course, that an aperture 46 is provided in the partition 22 through which the connector 36 may move without interference. In operation the device is normally held inoperative with the operative parts thereof held in the positions indicated upon Fig. 1. Here the tire is shown, fully inflated, with the flexible strip 26 frictionally retained against longitudinal displacement by being compressed between the tube 16 and casing 14. In positioning the strip 26, that portion 33 extending through the aperture 29 in the rim 13 should be of such length that when the eye 37 is engaged upon the hook 32 the spring 41 will be compressed and the flange 21 will be brought upwards into engagement with the under side of the partition 22, thus preventing the clapper 19 from striking the bell 18. If desired the flange 21 may be composed of resilient material so that even though a slight space remains between the flange 21 and partition 22, sounding of the bell will not result.

When the tire 12 becomes deflated beyond a predetermined minimum pressure, the friction developed by engagement of the flexible strip 26 between the tube 16 and casing 14 will be so diminished that longitudinal displacement of the strip 26 can occur, the spring 41 pressing the plunger 43 downwardly and pulling the strip 26 outwards from the tire 12. This lowers the flange 21 away from the partition 22 with the result that the clapper 19 may swing back and forth and strike the flaring portion 12 of the signaling device 6, causing the vibration thereof, which produces a warning sound.

If desired, the apertures 29 in the rim 13 and 31 and 32 in the felloe 8 may be the apertures through which extends the valve stem by means of which the tube 16 is inflated. This is not an essential feature, however, and separate apertures may be provided if desired.

To facilitate setting the device, the signaling device 6 should be spaced a short distance from the inner face 7 of the felloe 8. When the tube 16 is mounted within the casing 14 the strip 26 should be disposed therebetween, extending around the tube 16 and the end 33 left extending from between the opposed edges 27 and 28 as above described, then when the tube and casing 16 and 14, respectively, are mounted upon the rim 13 this end 33 should be extended through the aperture 29 in the rim 29. When the rim 13 is then inserted upon the felloe 8, this end 33 and the hook 34 should be extended through the apertures 31 and 32 of the felloe 8. The space 46 left between the top 42 of the signaling device 6 and the inner face 7 of the felloe 8 permits the operator to insert his fingers and engage the eye 37 upon the hook 34. If desired a pin 47 may be provided to be inserted through an aperture 48 in the tubular portion 17 to engage the under side of the plunger 43 after the spring 41 has been compressed and thus facilitate engagement of the eye 37 upon the hook 34.

Various changes may be made in the details of construction without departing from the spirit or scope of the invention as defined by the appended claims.

I claim:

1. A deflation indicator for a pneumatic tire comprising a tube inclosed within a casing and mounted upon a rim, said rim being demountably secured upon a wheel felloe, said indicator comprising a flexible strip frictionally retained against longitudinal displacement between said tube and casing when the tire is inflated, engaging means secured to one end of said strip and extending through aligned apertures in said rim and felloe, a bell comprising a tubular portion and a flaring portion depending therefrom, clamps associated with said bell engageable upon spokes of said wheel felloe for positioning the bell therebetween and spaced from the inside of said felloe, a plunger slidable in said tubular portion, a spring under compression between the top of said bell and said plunger, means secured to said plunger and extending through an aperture in the top of said bell engageable with said engaging means, a partition in said tubular portion limiting the downward movement of said plunger, a clapper, a flexible connector secured to said clapper and to said plunger and extending through an aperture in said partition, and a flange on said clapper, said connector being of such length that the flange engages the partition when the plunger is raised within the tubular portion.

2. A deflation indicator for a pneumatic tire comprising a tube inclosed within a casing and mounted upon a rim, said indicator comprising a flexible strip frictionally retained against longitudinal displacement between said tube and casing when the tire is inflated, engaging means secured to one end of said strip and extending through said rim, a bell comprising a tubular portion and a flaring portion depending therefrom, clamps associated with said bell engageable upon spokes of said wheel felloe for positioning the bell therebetween, a plunger slidable in said tubular portion, a spring under compression between the top of said bell and said plunger, means secured to said plunger and extending through an aperture in the top of said bell engageable with said engaging means, a partition in said tubular portion limiting the downward movement of said plunger, a clapper, a flexible connector secured to said clapper and to said plunger and extending through an aperture in said partition, and a flange on said clapper, said connector being of such length that the flange engages the partition when the plunger is raised within the tubular portion.

3. A deflation indicator for a pneumatic tire comprising a tube inclosed within a casing and mounted upon a rim, said indicator comprising a flexible strip frictionally retained against longitudinal displacement between said tube and casing when the tire is inflated, engaging means secured to one end of said strip and extending through said rim, a bell comprising a tubular portion and a flaring portion depending therefrom, means for positioning said bell adjacent the inside of the rim, a plunger slidable in said tubular portion, a spring under compression between the top of said bell and said plunger, means secured to said plunger and extending through an aperture in the top of said bell, engageable with said engaging means, a partition in said tubular portion limiting the downward movement of said plunger, a clapper, a flexible connector secured to said clapper and to said plunger and extending through an aperture in said partition, and a flange on said clapper, said connector being of such length that the flange engages the partition when the plunger is raised within the tubular portion.

4. A deflation indicator for a pneumatic tire comprising a tube inclosed within a casing and mounted upon a rim, said indicator comprising a flexible strip frictionally retained against longitudinal displacement between said tube and casing when the tire is inflated, engaging means secured to one end of said strip and extending through said rim, a bell comprising a tubular portion and a flaring portion depending therefrom, means for positioning said bell adjacent the inside of the rim, a plunger slidable in said tubular portion, a spring under compression between the top of said bell and said plunger, means secured to said plunger and extending through an aperture in the top of said bell, engageable with said engaging means, a clapper, a flexible connector secured to said clapper and said plunger, and means holding said clapper in inoperative position when the plunger is raised within the said tubular portion.

5. A deflation indicator for a pneumatic tire comprising a tube inclosed within a casing and mounted upon a rim, said indicator comprising a flexible strip frictionally retained against longitudinal displacement between said tube and casing when the tire is inflated, engaging means secured to one end of said strip and extending through said rim, a bell comprising a tubular portion and a flaring portion depending therefrom, means for positioning said bell adjacent the inside of the rim, a clapper, flexible means connecting said clapper to said engaging means through apertures in said rim and the top of said bell, and means holding said clapper in inoperative position when the clapper is drawn upwards into the bell by said strip.

6. A deflation indicator for a pneumatic tire comprising a tube inclosed within a casing and mounted upon a rim, said indicator comprising a flexible strip frictionally retained against longitudinal displacement between said tube and casing when the tire is inflated, a bell comprising a tubular portion and a flaring portion depending therefrom, a clapper, flexible means connecting said clapper to said flexible strip through apertures in said rim and the top of said bell, and means holding said clapper in inoperative position when the clapper is drawn upwards into the bell by said strip.

7. A deflation indicator for a pneumatic tire comprising a tube inclosed within a casing, said indicator comprising a flexible strip disposed between the tube and casing and held against longitudinal displacement when said tire is inflated, one end of said strip extending outside of said casing, and a signaling device associated therewith comprising means for giving a signal, said device being normally held inoperative by said strip but becoming operative when the tire becomes sufficiently deflated to permit longitudinal displacement of the strip.

8. A deflation indicator for a pneumatic tire comprising a tube inclosed within a casing, said indicator comprising a flexible strip disposed between the tube and casing and held against longitudinal displacement when said tire is inflated, one end of said strip extending outside of said casing, a signaling device associated therewith comprising means for giving a signal, means normally holding said signaling device inoperative, and means for withdrawing said strip from the tire when the latter has become deflated and releasing said holding means.

9. A deflation indicator for a pneumatic tire, comprising a retaining member engaged by said tire when inflated, means for displacing said retaining member when disengaged by said tire, said disengagement occurring when the tire becomes deflated below a predetermined value, and signaling means held inoperative by said retaining means until said disengagement occurs.

10. A deflation indicator for a penumatic tire, comprising a retaining member engaged by said tire when inflated, means for displacing said retaining member when disengaged by said tire, said disengagement occurring when the tire becomes deflated below a predetermined value, and a bell and a clapper therefor, connected to said retaining means and held inoperative thereby until said disengagement occurs.

11. A deflation indicator for a pneumatic tire, comprising a tube enclosed within a casing, said indicator comprising a retaining member interposed between said tube and casing, and a signaling device associated therewith and normally held inoperative thereby, said signaling device becoming operative upon movement of said retaining means.

12. A deflation indicator for a pneumatic tire, comprising a tube enclosed within a casing, said indicator comprising a retaining member interposed between said tube and casing, and a signaling device associated therewith and normally held inoperative thereby, and a spring urging said retaining member into position wherein it releases said signaling device for operation.

13. A deflation indicator for a pneumatic tire, comprising a signaling device, means normally holding said signaling device inoperative, said means being engaged by said tire when the tire is inflated, and being adapted to release said signaling device for operation when the tire becomes deflated beyond a predetermined value.

In testimony whereof I have signed my name to this specification.

F. F. BURDEN.